Patented May 6, 1941

2,241,340

UNITED STATES PATENT OFFICE 2,241,340

PLASTICIZED COUMARONE-INDENE RESIN

William H. Carmody, Pittsburgh, Pa., assignor to The Neville Company, Pittsburgh, Pa., a corporation of Pennsylvania No Drawing. Application May 21, 1938, Serial No. 209,368

4 Claims. (Cl. 260—42)

This invention relates to the plasticizing of coumarone-indene resins.

The coumarone-indene resins, sometimes referred to in the trade as coumarone or paracoumarone resins, have various properties which adapt them admirably for use as coating or impregnating materials. In the higher melting grades, which are necessary for such uses, these resins are quite brittle, so that they are per se unsuited for the coating or impregnating of many types of articles. It has been proposed to compound the resin with plasticizing materials, to confer flexibility and toughness upon the compound. Certain difficulties have been encountered, however, in plasticizing these resins, largely because of their general lack of compatibility with materials capable of eliminating brittleness and at the same time of providing compounds free from stickiness, or tackiness. Heretofore plasticizing of these resins has been confined, as far as I am aware, to the use of the so-called heavy oil, comprising largely oily dimers and trimers of coumarone and indene, produced in the manufacture of hard resin of this class. This practice does soften or toughen the resin, but this is accomplished at the expense of melting point, the melting point being lower than that of the resin because the heavy oil used acts as a solvent for the resin. A true plasticizer, on the other hand, should be compatible with the resin without acting as a solvent therefor.

It is among the objects of this invention to provide plasticized coumarone-indene resins which are adequately free from brittleness, even in the form of thin films, by the use of a plasticizer which not only affords satisfactory flexibility and toughness, but which is capable also of providing non-tacky films, and clear, transparent products with certain types of modified resins of this class.

I have discovered that although rubber and synthetic rubbers of, for instance, the "Duprene" type are not satisfactory plasticizers for coumarone-indene resin, such resin is satisfactorily compoundable, especially in certain modified forms, with a rubber-like polymerized material sold under the trade-name "Vistanex" by Advance Solvents & Chemical Corporation, 245 Fifth Avenue, New York, N. Y. While the exact composition and mode of producing this material are not known to me, it is said in U. S. Patent No. 2,149,039, granted December 27, 1938, on an application filed by A. Abrams et al. on June 28, 1937, to be an isobutylene polymer made as described in U. S. Patent No. 2,051,840, granted August 25, 1936, on an application filed by H. L. Gerhart. This material is available in a grade, preferred in the practice of this invention, which is a soft, plastic and flexible rubber-like polymerized material. It is available also in the form of a quite viscous liquid which is also compatible with the resin but, at least for many purposes, is not as desirable as the form just referred to.

A solvent is necessary in the production of compositions intended for coating purposes, such as for the coating of tinplate, and the benefits of the invention may be exemplified particularly with reference to such solutions. In making the tests referred to hereinafter there were used solutions of coumarone-indene resin, or modified types thereof, in toluol in the proportion of two grams of resin to 10 cubic centimeters of the solvent. Solutions of the rubber-like plastic grade of Vistanex were made in the same manner and of the same strength. These provided stock solutions from which mixes could be made to give desired percentages of the two materials.

Referring first to the use of ordinary commercial coumarone-indene resin, the stock solution was made from a standard grade of resin of 160° C. melting point, a color of one-half on the resin scale, and a solubility in Stoddard solvent naphtha of 59° C. to 56° C. Such a resin will have a molecular weight of about 800. A composition containing about 1 per cent of Vistanex produced brittle films on tinplate, but with about 3 per cent or more of Vistanex the films were flexible, and in the range of about 3 to about 10 per cent of Vistanex they were free from tackiness. At about 10 per cent of Vistanex, however, the films were slightly tacky, and the tackiness increased with further increase in this constituent. Although as far as I am aware flexible films are produced with all proportions above about 3 per cent of Vistanex, for economic considerations and to maintain predominantly the properties of the coumarone resin, relatively low percentages of the plasticizer are generally desirable.

It was characteristic of all the compositions produced with the foregoing resin that the films produced exhibited more or less cloudiness. While this would not be objectionable for some purposes, some uses demand the production of a clear film. I have discovered that such compatibility of coumarone-indene resin and Vistanex is attainable through the use of hydrogenated coumarone-indene resin. Such a modified resin may be produced, for instance, in accordance with the disclosure of my co-pending application Serial No. 1897, filed January 15, 1935, by forming a solution of the resin in petroleum benzine or the like solvent, adding a highly active hydrogenation catalyst, such as catalytically active nickel, and subjecting the resin in solution to the action of gaseous hydrogen, suitably at elevated pressure and at a temperature in the vicinity of about 200° C. The hydrogenated resin is recovered by distillation of the solvent.

Such hydrogenated resin is compatible, apparently in all proportions, with Vistanex, and the films produced are clear and free from cloudiness. The films tend to be somewhat brittle at about 1 per cent of Vistanex, but toward 3 per cent they are satisfactorily flexible. Tests with progressively increased amounts of Vistanex up to 40 per cent showed maintenance of this flexibility, and I have reason to believe that it characterizes all of the compositions containing more than about 3 per cent of Vistanex. With compositions containing less than about 10 per cent of Vistanex the films were free from tackiness.

The same relationships are shown by coumarone-indene resins of high molecular weight. For instance, compositions made from a resin having a melting point of about 240° to 245° C. and a molecular weight of about 2200 were productive of flexible films with Vistanex in amounts in excess of about 5 per cent, although in all instances up to 20 per cent of Vistanex, the highest proportion tested, the films were cloudy. Although the films with up to 3 per cent of Vistanex were brittle, all of the compositions containing up to about 10 per cent of Vistanex, gave films free from tackiness, as in the preceding examples.

Hydrogenation of this high molecular weight resin converted it to a form in which all of the compositions containing from 1 per cent upwards of Vistanex produced clear films free from cloudiness, and the films were flexible beginning at about 5 per cent of Vistanex, and were free from tackiness up to about 10 per cent, although with larger amounts they were consistently tacky.

Investigation of other types of modified coumarone-indene resins has shown that they are applicable, at least to some extent, in the practice of the invention. In one series of tests there was used a phenolically modified coumarone-indene resin produced by the polymerization of the polymerizable constituents, chiefly coumarone and indene, contained in crude solvent naphtha, while concurrently effecting involvement with cresylic acid. Such phenolic involvement during polymerization of these materials produces a resin which is alcohol-soluble, in contrast to ordinary, unmodified coumarone-indene resin. This modified resin, like the hydrogenated resins referred to, produced clear and flexible films with as little as 1 per cent of Vistanex. The quality of flexibility was maintained with higher percentages of Vistanex, and although only those containing as much as 20 per cent were studied, I believe that the quality of flexibility characterizes films formed from the two materials in all proportions. In the case of this modified resin the films become cloudy at about 5 per cent of Vistanex, and this characterized those with higher percentages of the plasticizer. At about 10 per cent of Vistanex the films began to exhibit tackiness.

These compositions exhibited another property which is desirable for some purposes, namely, lack of tendency to slip or flow at moderately elevated temperatures. In the lower melting grades, such as the phenolically modified resin to which reference has been made, there is a tendency for the resin to flow at moderately elevated temperatures. The plasticizer which characterizes this invention appears to stiffen the resin so that it resists such flow, as indicated by the fact that a film of the resin with 3 per cent of Vistanex did not flow from tinplate when the temperature was raised to 150° C. The film was tacky at such temperature and could be drawn out in rubber-like threads, but showed no inclination whatever to flowing or slippage.

The properties produced by plasticizing coumarone-indene resins in this manner adapts the compositions particularly for uses where a flexible film covering is important, as, for instance, for lining cans for beverages or food, for the impregnation of paper or cardboard for various parts of food containers or other uses, and for the protection of paper objects such as catalog covers, the face of printed matter, and the like. Especially desirable is the use of the hydrogenated coumarone-indene resin, and the composition containing 10 per cent of Vistanex in a suitable solvent, such as toluol, when applied to paper gives a clear flexible film that is colorless, water-proof, and acts as a stiffener for the underlying base. With reference to the coating of food and beverage containers, the properties of the resin render these compositions desirable because the resins are not affected by alcohol, salt water or dilute acids, and they are tasteless, odorless, and virtually colorless. Other uses and advantages will appear to those skilled in the art.

According to the provision of the patent statutes, I have explained the mode of practicing my invention and have described what I now consider to represent its best embodiment. However, I desire to have it understood that, within the scope of the appended claims, the invention may be practiced otherwise than as specifically described.

I claim:

1. As a new composition of matter, a composition of hydrogenated coumarone-indene resin, from about 1 to 40 per cent of a rubber-like isobutylene polymer, and a solvent, said composition being productive of clear films.

2. As a new composition of matter, a composition of hydrogenated coumarone-indene resin, at least about 3 per cent of a rubber-like isobutylene polymer, and a solvent, said composition being productive of clear and flexible films.

3. As a new composition of matter, a compatible composition of hydrogenated coumarone-indene resin, at least about 1 per cent of a rubber-like polymer of isobutylene, and a solvent, said composition being productive of clear films.

4. As a new composition of matter, a compatible composition of hydrogenated coumarone-indene resin, from about 3 to 10 per cent of a rubber-like polymer of isobutylene, and a solvent, said composition being productive of clear, flexible, and non-tacky films.

WILLIAM H. CARMODY.